UNITED STATES PATENT OFFICE.

HARRY S. MORK, OF BROOKLINE, MASSACHUSETTS, ASSIGNOR, BY MESNE ASSIGNMENTS, TO AMERICAN LA FRANCE FIRE ENGINE COMPANY, INC., OF ELMIRA, NEW YORK, A CORPORATION OF NEW YORK.

FIRE-EXTINGUISHER COMPOSITION.

1,306,709.      Specification of Letters Patent.      Patented June 17, 1919.

No Drawing.      Application filed January 14, 1918. Serial No. 211,838.

*To all whom it may concern:*

Be it known that I, HARRY S. MORK, a citizen of the United States, residing at Brookline, county of Norfolk, State of Massachusetts, have invented a certain new and useful Fire-Extinguisher Composition, of which the following is a specification.

My invention relates to fire extinguisher charges and more particularly to the carbonate solution from which carbon dioxid for expelling the extinguishing medium is generated by reaction with a suitable acid. Alkali metal salts of carbonic acid, either in the form of bicarbonate or in the form of the normal carbonate have been commonly employed for such solutions, while sulfuric acid or hydrochloric acid has usually been employed as the acid charge. In order that the carbonate solution may always remain in a condition suitable for use even when exposed to low temperatures, it has been proposed to incorporate in the carbonate solution, an ingredient for lowering the freezing point thereof. Most of those ingredients which have been heretofore proposed for this purpose are subject to one disadvantage or another. In some instances, the addition agent tends to give rise to the formation of a precipitate of insoluble carbonate or other salt or to retard the generation or evolution of the carbon dioxid gas; or its effect in small quantities has not been sufficiently marked in depressing the freezing point.

The object of my invention is to produce a carbonate solution charge of the desired low freezing point which shall be free from the disadvantages above noted. At the same time, the invention seeks to avoid the use of ingredients which might involve undue expense, or which would in any way interfere with the fire extinguishing qualities of the medium which is to be ejected from the apparatus.

The solutions embraced by my present invention, exhibit all the required qualities as a charge for fire extinguishers and in addition to having the highly advantageous low freezing point, the capacity of the solution for giving off carbon dioxid gas when treated with acid, is greatly improved by the presence of the ingredients for lowering the freezing point.

To clearly illustrate the principles of the invention and to enable those skilled in the art to understand and practise the same, I shall describe certain specific examples of the same.

The invention comprises a carbonate solution for fire extinguishers, in which a potassium salt of carbonic acid and glycerin are present as essential ingredients. This solution may be made up, for example, as referred to in the following observations.

4.54 grams of potassium carbonate and 162 grams of glycerin when dissolved in 100 cubic centimeters of water, constitute a solution having a freezing point below $-54°$ F. This solution at ordinary temperatures is quite fluid and in every way suitable for employment in a fire extinguisher. As the temperature is lowered, to about $-44°$ F., the solution begins to become pasty. The evolution of carbon dioxid gas from the solution is considerably improved due to the presence of the glycerin as will be apparent from a comparison of a sample made up of the simple solution of potassium carbonate in water and one in which the glycerin is incorporated. Taking a test quantity of 15 cubic centimeters at $20°$ C. from a solution made up of 4.54 grams of potassium carbonate in 100 cubic centimeters of water, and treating this with 1 c. c. of sulfuric acid of sufficient strength to neutralize two-thirds of the carbonate present, the total gas evolution showed about $32\frac{1}{2}$ cubic centimeters at the end of the first minute, $33\frac{1}{2}$ cubic centimeters at the end of the second minute, $34\frac{1}{2}$ cubic centimeters at the end of the third minute, 35 cubic centimeters at the end of the fourth minute and no further increase up to the end of the fifth minute. The same test quantity at the same temperature from a solution made up of 4.54 grams of potassium carbonate and 162 grams of glycerin in 100 cubic centimeters of water, when treated with the same proportions of sulfuric acid showed a total gas evolution of about $39\frac{1}{2}$ cubic centimeters at the end of the first minute, $42\frac{1}{2}$ cubic centimeters at the end of the second minute, $43\frac{1}{2}$ cubic centimeters at the end of the third minute, $44\frac{1}{2}$ cubic centimeters at the end of the fourth minute, and no further increase up to the end of the fifth minute.

The bicarbonate of potassium may be used instead of the normal carbonate. In that case, the solution might comprise for example 6.6 grams of potassium bicarbonate and 149.8 grams of glycerin for each 100 c. c. of water. Such a solution would have a freezing point well below −70° F. and have greater capacity to set free carbon dioxid than when the glycerin is not included.

It will thus be seen that my invention provides not only for a very low freezing point of solution, but at the same time, considerably improves the capacity of the solution for developing carbon dioxid gas when treated with the acid in a fire extinguisher.

I claim:

A carbonate solution for fire extinguishers, comprising as essential ingredients normal potassium carbonate and glycerin, in substantially the proportions of 4.54 grams of potassium carbonate and 162 grams of glycerin in 100 cubic centimeters of water.

HARRY S. MORK.